Figure 1A:
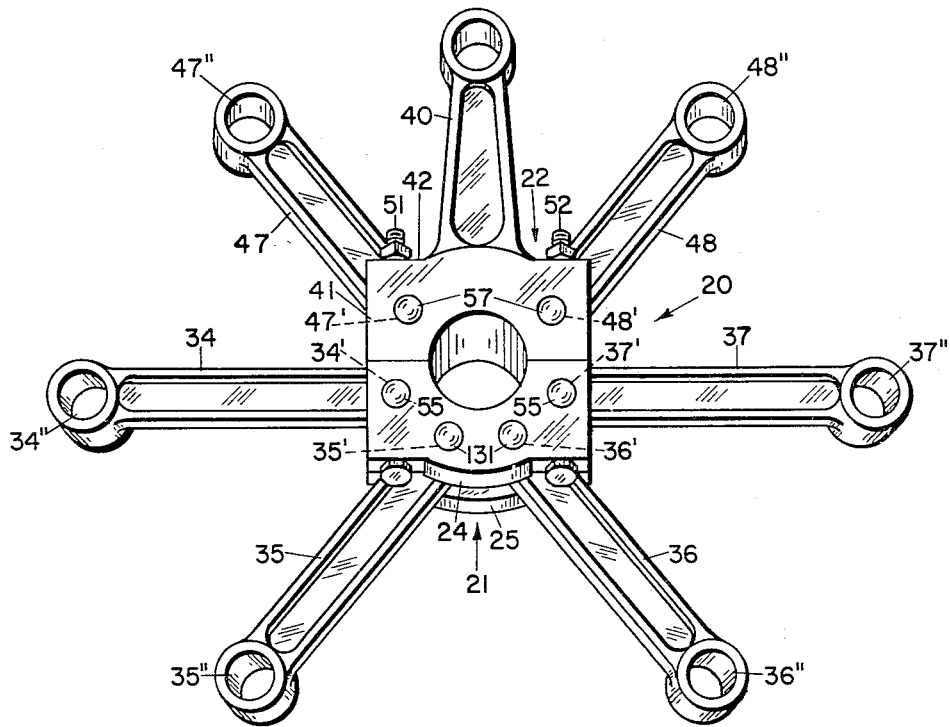
Figure 1A:
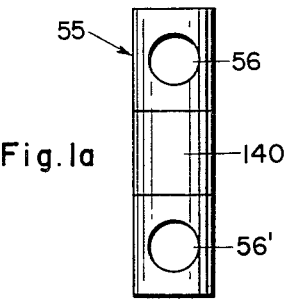

Fig. I

INVENTORS
VIRGIL R. CRUMPACKER
LESTER C. FENSTERMAKER
JOHN D. CHATTEN

BY
ATTORNEYS

June 26, 1956  V. R. CRUMPACKER ET AL  2,751,669
FIXTURE DEVICE

Filed Oct. 13, 1953  4 Sheets-Sheet 2

INVENTORS
VIRGIL R. CRUMPACKER
LESTER C. FENSTERMAKER
JOHN D. CHATTEN

BY
ATTORNEYS

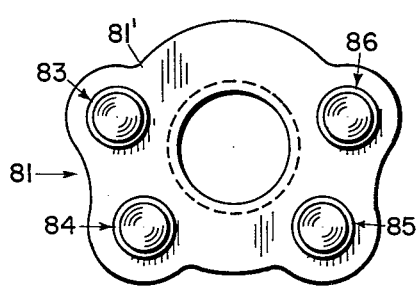
Fig. 4
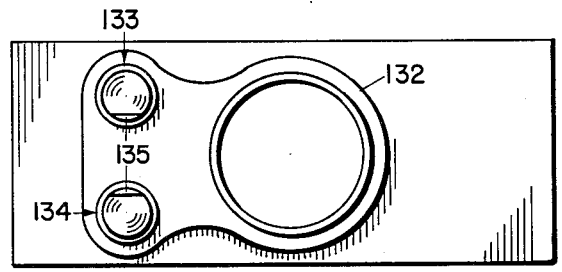
Fig. 13
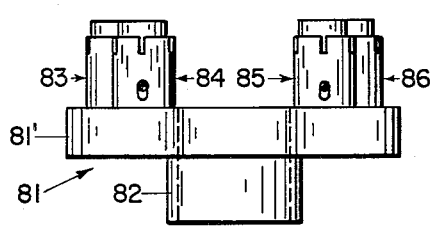
Fig. 5
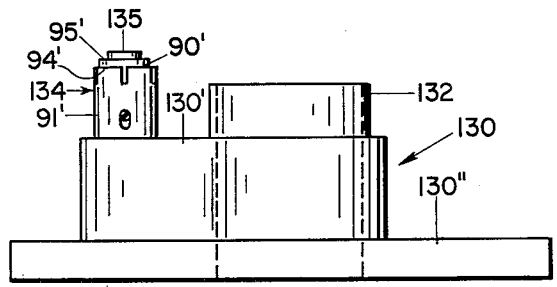
Fig. 14
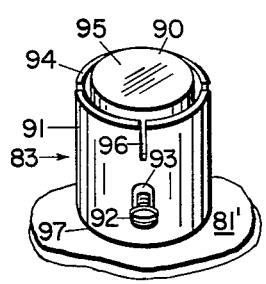
Fig. 6
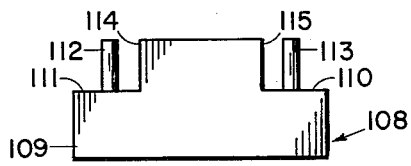
Fig. 8
Fig. 9
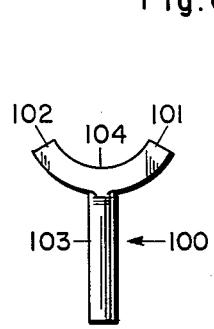
Fig. 7
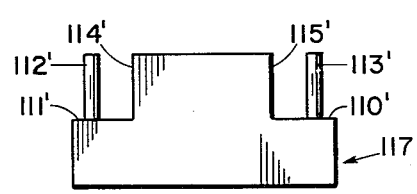
Fig. 10
*INVENTORS*
VIRGIL R. CRUMPACKER
LESTER C. FENSTERMAKER
JOHN D. CHATTEN
BY
*ATTORNEYS*

June 26, 1956   V. R. CRUMPACKER ET AL   2,751,669
FIXTURE DEVICE

Filed Oct. 13, 1953   4 Sheets-Sheet 4

INVENTORS
VIRGIL R. CRUMPACKER
LESTER C. FENSTERMAKER
JOHN D. CHATTEN

BY
ATTORNEYS

United States Patent Office 2,751,669
Patented June 26, 1956

2,751,669
FIXTURE DEVICE

Virgil R. Crumpacker, San Lorenzo, Lester C. Fenstermaker, Alameda, and John D. Chatten, Castro Valley, Calif.

Application October 13, 1953, Serial No. 385,902

5 Claims. (Cl. 29—200)

(Granted under Title 35, U. S. Code (1952), sec. 266)

The invention described herein may be manufactured and used by or for the Government of the United States of America for governmental purposes without the payment of any royalties thereon or therefor.

This invention relates to a fixture device for the installation of pins in an engine rod assembly, and is more particularly directed to an improved fixture or tool device for the installation of pivot or knuckle pins in an engine rod assembly used especially in aircraft engines of the radial type.

Engine rod assemblies of the type concerned with herein comprise a master rod and a plurality of articulating link rods associated therewith, all of said rods being connected to a central member. The link rods each have a socket at the ends thereof adapted to receive a pin for pivotal attachment of these rods to the master rod and central member.

Particularly in certain types of engine rod assemblies, described in detail hereinafter, it is necessary that the above noted pivot pins be carefully installed in the link rod sockets in proper alignment for engaging certain fasteners in a manner described below. However, when utilizing the prior art fixtures and tools for this purpose, generally a comparatively large amount of time is consumed for properly assembling the rods in the central member, scratching and marring of the plated surface of the pivot or knuckle pins often occur, and the pins tend to twist and turn in the link rod sockets so as to be improperly seated therein and out of alignment for proper engagement with the aforementioned fasteners.

One object of this invention is to provide a fixture device for the installation of pins in an engine rod assembly.

Another object is the provision of novel fixtures or tools for the rapid installation of pivot or knuckle pins in an engine rod assembly, particularly an aircraft engine rod assembly for radial engines, so that the pins are properly seated and aligned in the assembly, without damaging the surface of such pins or other elements of the assembly structure.

Yet another object is to afford devices of the foregoing type which are simple, rugged and inexpensive to make and operate.

Figure 1C:
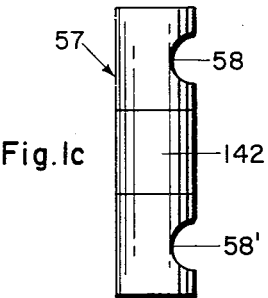
Figure 1B:
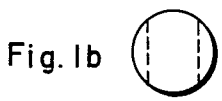
Figure 1D:

Other objects and many of the attendant advantages of this invention will be readily appreciated as the same becomes better understood by reference to the following detailed description when considered in connection with the accompanying drawings wherein:

Fig. 1 is an isometric view of an engine rod assembly assembled according to the invention, Fig. 1a is a side elevation of one type of pivot pin employed in the rod assembly of Fig. 1, Fig. 1b is a top view of the pin of Fig. 1a, Fig. 1c is a side elevation of another type of pivot pin, employed in the rod assembly of Fig. 1, Fig. 1d is a top view of the pin of Fig. 1c.

Figure 19:
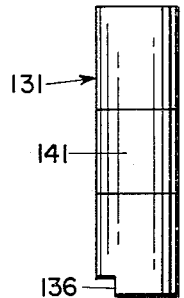
Figure 19A:
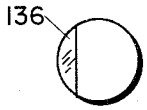
Figure 1E:
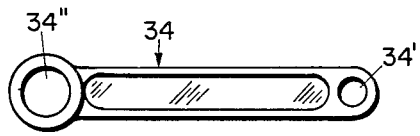
Figure 2:
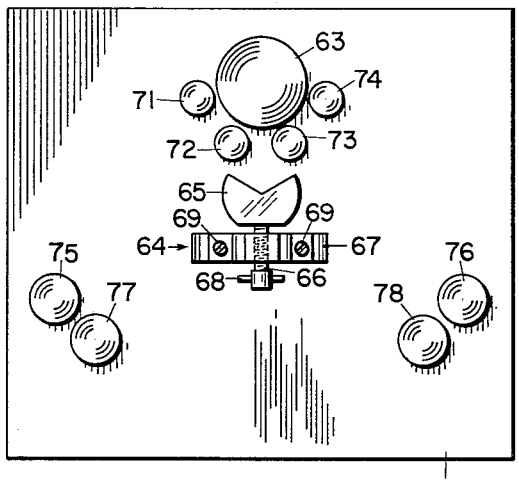
Figure 11:
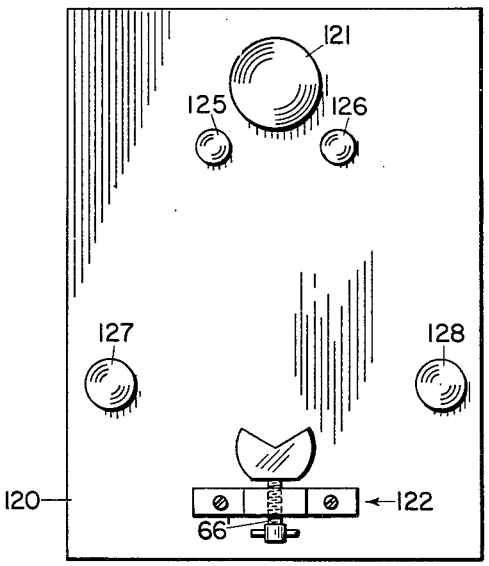
Figure 3:
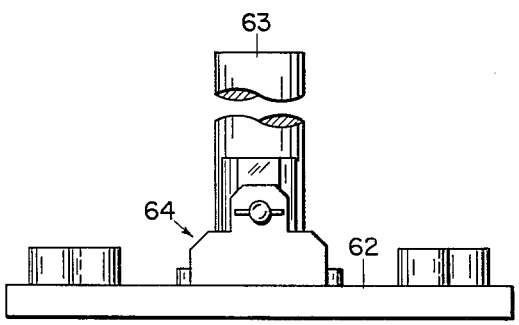
Figure 12:
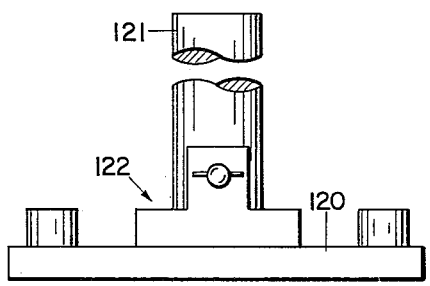
Figure 16:
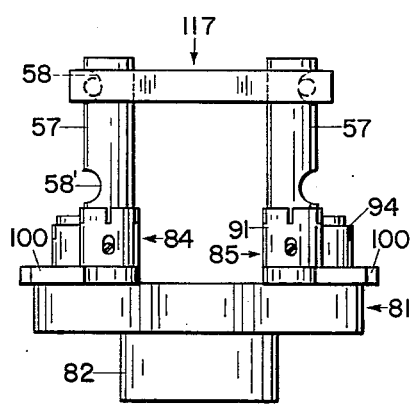
Figure 15:
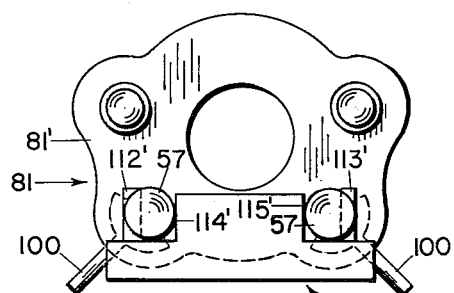
Figure 17:
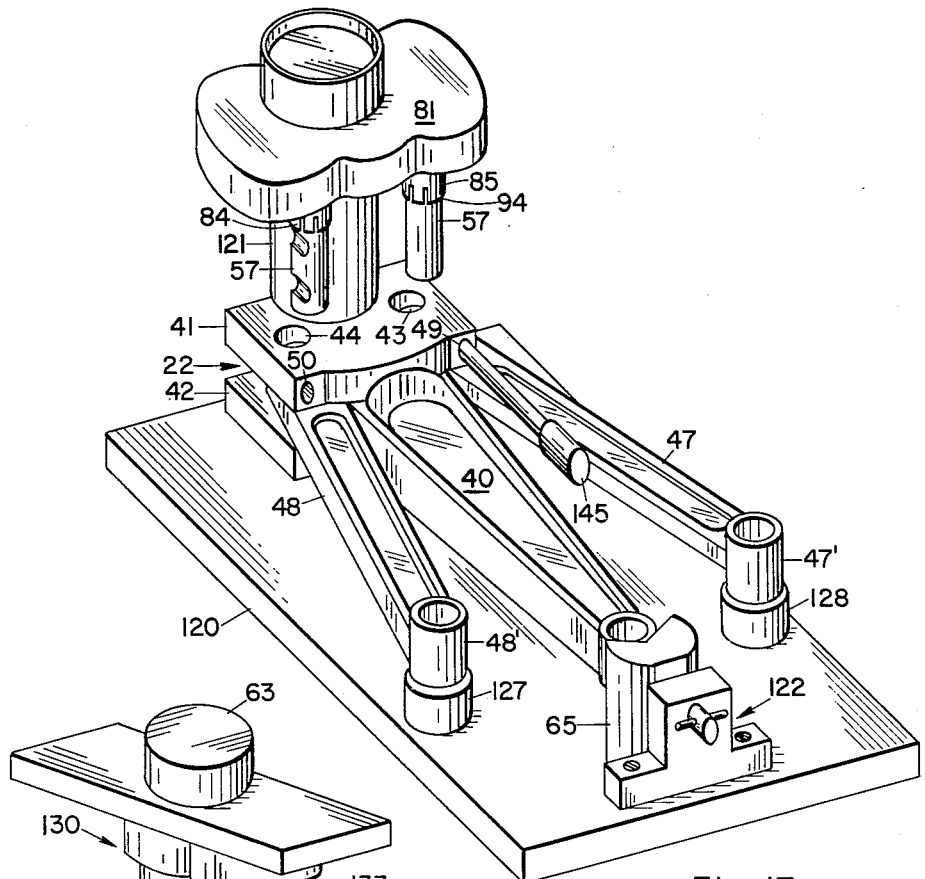
Figure 18:
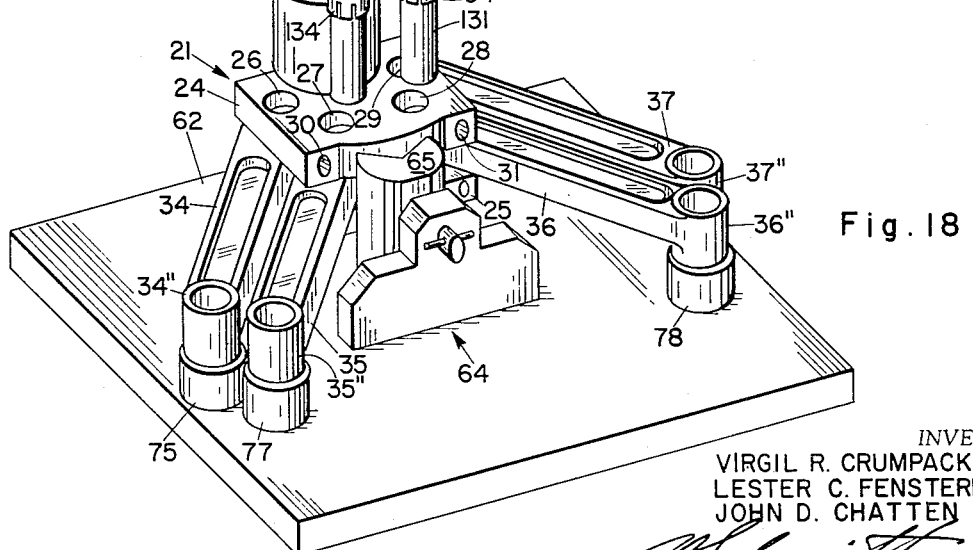

Fig. 1e is a plan view of a link rod employed in the engine rod assembly of Fig. 1, Fig. 2 is a plan view of a part of the fixture device of the invention for assembling the cap portion of the rod assembly of Fig. 1, Fig. 3 is a front view of the structure of Fig. 2, Fig. 4 is a plan view of another part of the invention device, Fig. 5 is a front view of the structure of Fig. 4, Fig. 6 is an isometric view of a detail of the structure shown in Figs. 4 and 5, Fig. 7 is a plan view of still another part of the fixture device of the invention, Fig. 8 is a front elevation of yet another part of the invention, Fig. 9 is a plan view of the structure of Fig. 8, Fig. 10 is a front elevation of still another part of the invention device, Fig. 11 is a plan view of a part of the fixture device of the invention for assembling the master rod portion of the rod assembly of Fig. 1, Fig. 12 is a front view of the structure of Fig. 11, Fig. 13 is a plan view of another part of the invention fixture device, Fig. 14 is a side elevation of the structure of Fig. 13, Fig. 15 is a top view of certain parts of the fixture device of the invention in cooperation during one step of the assembling procedure, Fig. 16 is a front elevation of the assembly of Fig. 15, Fig. 17 is an isometric view of the invention device shown during use in the installation of pivot pins in the master rod portion of the engine rod assembly of Fig. 1, Fig. 18 is an isometric view of the invention device shown during use in the installation of pivot pins in the cap portion of the engine rod assembly of Fig. 1, Fig. 19 is a side elevation of still another type of pivot pin employed in the rod assembly of Fig. 1, and Fig. 19a is a top view of the pin of Fig. 19.

The fixture or tool device of the invention is composed essentially of two tool combinations, one for assembling the cap portion of the engine rod assembly and the other for assembling the master rod portion of the assembly. Each of these combinations is composed of similar elements for the purpose of installing the pivot pins in the cap and master rod portions of the engine rod assembly. In addition, certain elements of these combinations are employed interchangeably therein.

Each of the tool combinations comprises a support or base member for supporting the cap or master rod portion of the engine rod assembly, and another member for supporting the pivot pins in a certain manner, hereinafter described, to install such pins in the rod assembly. The base member has a clamp means for securing the cap or master rod portion of the engine rod assembly in position thereon and a guide means to movably engage the pin supporting member to conduct it toward the base member for proper installation of the pivot pins in the rod assembly. Means generally in the form of stop members are located on the base member to contact one end of the pins for proper positioning thereof in the rod assembly. The pin supporting member is designed for movable engagement with the guide means of the base member for the purpose aforementioned, and has specially designed gripper members thereon securely holding the pins downwardly suspended when the pin supporting member is in cooperative engagement with the guide means, and adapted to release the pins upon proper positioning thereof in the rod assembly. Alignment means are also included for positioning the pins in the gripper members in a manner such that when the pins are seated in the rod assembly, the longitudinal apertures in the pins are properly aligned for passage of fasteners therethrough, as hereinafter more fully described.

In Fig. 1 is shown an engine rod assembly 20, assembled through the use of certain pivot pins which are installed by means of the fixture device of the invention. The engine rod assembly is composed of a cap half or cap portion 21 and a master rod half or portion 22. Cap portion 21 comprises similar upper and lower semi-circular plate members 24 and 25, respectively, spaced parallel to each other, each of such members having four approximately equally spaced circular holes 26, 27, 28 and 29 therein (see Fig. 18). At opposite ends of each of members 24 and 25 are two elongated parallel holes 30 and 31 (see Fig. 18) extending through the members normal to the aforementioned holes 26—29 and communicating with holes 26 and 29, respectively. In the space between members 24 and 25 are located four link rods 34, 35, 36 and 37, of the type shown in Fig. 1e, having sockets 34′, 35′, 36′ and 37′, respectively, at one end thereof and eyelets 34″, 35″, 36″ and 37″, respectively, at the other end thereof, the sockets being smaller in diameter than the eyelets. Each of the rods is positioned with the socket ends thereof between members 24 and 25, and the sockets located in line with holes 26, 27, 28 and 29 in these members. Such holes and their respective aligned sockets accommodate pivot pins which are installed therein, utilizing the invention device to fasten such rods pivotally to the cap portion 21 of the rod assembly.

The master rod portion 22 of the engine rod assembly comprises a master rod 40 fixedly attached to similar semi-circular plate members 41 and 42 maintained in spaced parallel relationship to each other, each of such members having a pair of circular holes 43 and 44 therein (see Fig. 17) in line respectively with each other. One end of each of two link rods 47 and 48 similar to the above link rods and having sockets 47′ and 48′ at one end thereof and eyelets 47″ and 48″ at the opposite ends thereof, are positioned between members 41 and 42, with the sockets of rods 47 and 48 in line with holes 43 and 44. Pivot pins are installed in holes 43 and 44 and the corresponding sockets of link rods 47 and 48 to fasten them pivotally to the master rod portion of the engine rod assembly. At opposite ends of each of members 41 and 42 are two elongated parallel holes or apertures 49 and 50 (see Fig. 17) extending through the members normal to and communicating with holes 43 and 44.

The cap portion 21 and the master rod portion 22 are connected together by means of through bolts 51 and 52 passing through the opposite parallel holes 30 and 31 of members 24 and 25, and similar holes 49 and 50 of members 41 and 42. The pivot pins installed in holes 26 and 29 of members 24 and 25 and the pivot pins installed in holes 43 and 44 of members 41 and 42, are designed with apertures therein so as to accommodate bolts 51 and 52 fastening the two portions 21 and 22 of the rod assembly together. For this purpose, as seen in Figs. 1a and 1b, pivot pins 55, which are adapted to be seated in holes 26 and 29 of cap portion 21 of the rod assembly, each contain two longitudinally extending apertures 56 and 56′ near the top and bottom thereof, and, as seen in Figs. 1c and 1d, pivot pins 57, which are adapted to seat in holes 43 and 44 of the master rod portion 22 of the rod assembly, each contain two longitudinally extending holes or slots 58 and 58′ along one edge thereof near the top and bottom of the pin. Hence, it is noted that bolts 51 and 52 connecting the cap and master rod portions of the assembly entirely pass through or fully intersect pivot pins 55 while only partially passing through or intersecting pivot pins 57.

Referring now to Figs. 2 and 3 of the drawing, representing a part of the fixture device of the invention for installing pivot pins in the cap portion 21 of the engine rod assembly, reference numeral 62 is a base plate on which is adapted to be positioned cap portion 21 and its associated link rods 34, 35, 36 and 37. The base plate has thereon a cylindrical guide post 63 extending from the base plate in a direction normal thereto, and a clamp member 64 spaced from the guide post. The clamp member comprises a V-shaped contact member 65 adapted to be moved toward and away from the guide post by means of a screw 66 threadably engaged within a post 67 fixedly attached to the surface of base plate 62 by means of bolts 69, the screw having a handle 68 at its end for operation thereof. The cap portion 21 of the engine rod assembly is adapted to be positioned between clamp member 64 and guide post 63 and held securely in this position by tightening screw 66.

Base plate 62 also has thereon four lugs or bottoms 71, 72, 73 and 74 approximately equally spaced around that half of cylindrical guide post 63 facing clamp member 64. Also located on the surface of base plate 62 are two buttons 75 and 76 positioned opposite one another on the other side of clamp member 64 from guide post 63, and two additional oppositely located buttons 77 and 78 closely adjacent buttons 75 and 76, respectively, but spaced closer together than the latter. The cap portion 21 of the engine rod assembly and the link rods associated therewith are positioned on the base plate 62 so that holes 26, 27, 28 and 29 of the cap portion are located over and in line respectively with lugs 71, 72, 73 and 74 of the base plate, with eyelets 34″, 35″, 36″ and 37″ at the ends respectively of link rods 34, 35, 36 and 37 resting on buttons 75, 77, 78 and 76 respectively of the base plate, as noted in Fig. 18.

In Fig. 4 is shown a ram head 81 which is designed to cooperate with the fixture of Fig. 2 for installation of the fully intersected pivot pins 55 in holes 26 and 29 of cap portion 21 and in the aligned sockets of link rods 34 and 37 associated therewith. Ram head 81 comprises a base plate 81′ having a hollow, cylindrical portion 82 positioned substantially centrally therein and adapted for sliding engagement with guide post 63 of base plate 62. Located in spaced relationship about the cylindrical portion 82 of the ram head are four gripper members 83, 84, 85 and 86, members 83 and 86 being directly opposite each other and members 84 and 85 also being directly opposite one another but closer together than members 83 and 86. Gripper members 83 and 86 are spaced so that when ram head 81 is in operative sliding engagement with guide post 63 of base plate 62, such gripper members may be positioned in direct alignment with buttons 71 and 74 on the base plate.

Gripper members 83, 84, 85 and 86 of ram head 81 have the same structure. Referring particularly to Fig. 6 showing one of these gripper members 83, it is seen that each of these members is composed of a solid cylindrical base member 90 and a sleeve 91 slidably positioned theron for movement through a predetermined distance along the base member. A lug 92 is connected to the side of base member 90 and is engaged in a longitudinal slot 93 of sleeve 91. The length of the slot is such that the sleeve is movable longitudinally along base member 90 a short predetermined distance such that end 94 of the sleeve extends a short distance beyond the end or top 95 of the base member. In this extended position, end 94 of sleeve 91 is adapted to engage the end of a pivot pin which is brought into contact with end 95 of base member 90. For efficiently gripping a pivot pin in this manner, sleeve 91 has a series of slots 96 positioned around its end 94. The sleeve is constructed of spring steel and the slotted end thereof is adapted to hold a pin in its grasp by spring tension. When gripper members 83, 84, 85 and 86 are not in operative engagement with a pivot pin, sleeves 91 of these members are in the position shown in Figs. 5 and 6, that is, with the ends 94 of such sleeves located below ends 95 of the base members 90 and with the opposite ends 97 of the sleeves in contact with plate 81′ of the ram head.

In order to bring a pivot pin into engagement with one of the gripper members, a fork-like tool 100 is provided, as shown in Fig. 7, having two prongs 101 and 102 and a handle 103. The inner surface 104 between prongs 101 and 102 of the tool has a circular contour matching the circular shape of base members 90 of gripper members 83, 84, 85 and 86, and when it is desired to bring these members into engagement with a pivot pin, the sleeves of the gripper members are manually raised a distance such that ends 94 thereof are in operative position above ends 95 of their associated base members 90, and prongs 101 and 102 of tool 100 inserted between plate 81' of the ram head and the adjacent end 97 of each of the sleeves, with the curved inner surface 104 of the tool in contact with the curved side of base member 90. In this manner, the sleeve is supported in its extended operative position while a pin is placed in engagement therewith. Figs. 15 and 16 show two of the fork-like tools 100 in operative relation with the lower ends 97 of the sleeves of gripper members 84 and 85 during the step of bringing a pair of pivot pins 57 into engagement with these gripper members.

As previously noted, pivot pins 55 to be engaged within holes 26 and 29 of the cap portion 21 of the rod assembly, have two longitudinallly extending apertures 56 and 56' therein, and pivot pins 57, to be engaged within holes 43 and 44 of the master rod portion 22 of the assembly, also have a pair of longitudinally extending apertures or notches 58 and 58' therein, for passage through these pins of bolts 51 and 52, which serve to connect cap portion 21 with master rod portion 22 of the rod assembly. Hence, it is seen that when pivot pins 55 are seated in holes 26 and 29 and in the aligned sockets of link rods 34 and 37, and when pivot pins 57 are seated in holes 43 and 44 and in the aligned sockets of link rods 47 and 48, apertures 56 and 56' of pins 55 and apertures 58 and 58' of pins 57 must be properly aligned with parallel holes 30 and 31 to permit passage of the bolts 51 and 52 through these pins. In order to satisfactorily locate pins 55 and 57 in the engine rod assembly in the manner indicated, it is necessary while installing them that these pins be in proper position during engagement by their respective gripper members so that when the pivot pins are released from these members and are seated in their respective places in the rod assembly, bolts 51 and 52 may be accommodated by these pins. For this purpose two alignment members 108, shown in Figs. 8 and 9, and 117, shown in Fig. 10, are provided.

Alignment member 108 is composed of a rectangular supporting member 109 having two substantially square cutouts 110 and 111 at opposite corners of the upper portion thereof. Supported in each of the cutouts 110 and 111 are two parallel alignment bars 112 and 113 respectively. These bars are adapted to be inserted into apertures 56 and 56' of a pair of pivot pins 55, and the distance between each of such bars and the adjacent parallel sides 114 and 115 of alignment member 108 is such that when two pivot pins 55 are engaged by these alignment bars, the pins fit snugly within cutouts 110 and 111, adjacent sides 114 and 115. The pivot pins so engaged by alignment member 108 are then brought into operative relation with gripper members 83 and 86 of ram head 81 in the manner described hereinafter.

Fig. 10 shows a second alignment member 117 having substantially the same structure as alignment member 108, including cutouts 110' and 111', and alignment bars 112' and 113', except that these alignment bars are spaced a greater distance away from the adjacent sides 114' and 115' of alignment member 117 than in the case of alignment member 108. Alignment bars 112' and 113' of alignment member 117 are adapted to be inserted into apertures or notches 58 and 58' of a pair of pivot pins 57, the sides of the pins opposite such apertures abutting sides 114' and 115' of the alignment member, as seen in Fig. 15, thereby maintaining the pivot pins snugly within cutouts 110' and 111' of the alignment member while the pins are placed in operative engagement with gripper members 84 and 85 of ram head 81, as hereinafter described.

Referring to Figs. 11 and 12, representing another part of the fixture device of the invention for installing pivot pins in the master rod portion 22 of the engine rod assembly, reference numeral 120 is a base plate similar to base plate 62 of Fig. 2, and on which is adapted to be positioned master rod portion 22 and its associated link rods 47 and 48. Base plate 120 has near one end thereof a cylindrical guide post 121 extending from the base plate in a direction normal thereto, and near the other end thereof a clamp member 122 spaced from the guide post, said clamp member having the same structure as clamp member 64 of Fig. 2. The master rod portion of the engine rod assembly is adapted to be positioned between clamp member 122 and guide post 121 and held securely in this position by tightening screw 66'.

Base plate 120 also has thereon two lugs or buttons 125 and 126 spaced opposite each other closely adjacent that portion of guide post 121 facing clamp member 122. Also located on the surface of base plate 120 are two buttons 127 and 128 positioned at opposite sides of the base plate between guide post 121 and clamp member 122, and closely adjacent the latter. The master rod portion 22 of the engine rod assembly and the link rods 47 and 48 associated therewith are positioned on the base plate 120 so that holes 44 and 43 of the master rod portion are positioned over and in line with lugs 125 and 126, respectively, of the base plate, with link rods 48 and 47 located so that the eyelets 48" and 47" at the ends thereof are resting on buttons 127 and 128 respectively of the base plate, as noted in Fig. 17.

Ram head 81, in addition to cooperating with the fixture of Fig. 2 for the installation of pivot pins 55, is also designed to cooperate with the fixture of Fig. 11 for installing the partially intersected pivot pins 57 in holes 43 and 44 of maser rod portion 22 and in the aligned sockets of link rods 47 and 48 associated therewith. Thus, cylindrical portion 82 of ram head 81 is adapted for sliding engagement with guide post 121 of base plate 120. Gripper members 84 and 85 of ram head 81 are spaced so that when ram head 81 is in operative sliding engagement with guide post 121 of base plate 120, such gripper members may be positioned in direct alignment with buttons 125 and 126 on this base plate.

Fig. 13 shows another ram head 130 which is also designed to cooperate with the structure of Fig. 2 for installation of a pair of pivot pins 131 (see Figs. 19 and 19a) in holes 27 and 28 (see Fig. 18) of cap portion 21 and in the aligned sockets of link rods 35 and 36 associated therewith. Pivot pins 131 are completely solid cylindrical members having no holes or notches therein as in the case of pivot pins 55 and 57. Ram head 130 comprises a plate 130' attached to a base 130" and a hollow cylindrical portion 132 positioned thereon and adapted for sliding engagement with guide post 63 of base plate 62. Located on plate 130' in spaced relation opposite each other and closely adjacent cylindrical portion 132 is a pair of gripper members 133 and 134 having essentially the same structure, shown in Fig. 6, as gripper members 83, 84, 85 and 86 of ram head 81. However, it is noted that ends 95' of base members 90' of these gripper members have a raised shoulder 135 thereon. These shoulders are adapted to mate with corresponding recesses 136 on the ends of pivot pins 131 to be engaged by such gripper members. This mating structure between gripper members 133 and 134 and pivot pins 131 serves to prevent pins 131 from moving or rotating when engaged by the gripper members during installation of the pins. If desired, the foregoing mating structure may be utilized with respect to pins 55 and 57, and the gripper members 83, 84, 85 and 86 of ram head 81, for aligning these pins properly in their seats in the engine rod assembly, thus eliminating the need for alignment members 108 and 117.

The operation of the invention device is as follows:

The rod portion 22 of the engine rod assembly is positioned on the base plate 120 of the fixture device of the invention in the manner indicated in Fig. 17 so that the outer end of the master rod 40 abuts clamp member 122. The clamp member is then tightened to secure the master rod in position. Articulating link rods 47 and 48 are then located on base plate 120, with the respective sockets 47' and 48' at one end of each of the rods positioned with respect to the master rod so that such sockets are in alignment with holes 43 and 44 therein, eyelets 47" and 48" of the rods resting on the buttons 128 and 127 respectively of base plate 120.

Sleeves 91 of each of the tension gripper members 84 and 85 of ram head 81, are raised to extend beyond the ends 95 of base members 90, and two of the fork-like tools 100 are inserted between the lower end of each sleeve and the plate 81' of the ram head. Two of the partially intersected pivot pins 57, are positioned on alignment bars 112' and 113' of alignment member 117 by inserting these bars through holes 58 adjacent one end of each of the pins. This assembly is then brought into contact with the ram head 81 having its gripper members 84 and 85 in operative extended position, as seen in Figs. 15 and 16, so that one end of each pin is supported by the end or top surface 95 of gripper members 84 and 85, whereby the ends of the pins become lodged in gripper members by tension and frictional contact of the ends 94 of sleeves 91 with the pins.

The fork-like tools 100 are then removed from the assembly, the sleeves 91 of the gripper members 84 and 85 remaining in their extended position in gripping engagement with the pins. Alignment bars 112' and 113' of alignment tool 117 are then withdrawn from the holes 58 of the pivot pins, and the ram head 81 with the pins attached to gripper members 84 and 85 thereof is inverted and slid over the top of guide post 121 of base plate 120 in the manner shown in Fig. 17, the inner surface of member 82 of the ram head slidably engaging the guide post. With a downward thrust from its position in Fig. 17, pivot pins 57 are driven into position in holes 43 and 44 of the master rod portion 22 and into the corresponding sockets of link rods 47 and 48, and come to rest with the bottoms of the pins against stop members 125 and 126 on base plate 120. However, just before the pins come into engagement with these stop members, the extended edges 94 of the sleeves of gripper members 84 and 85 attached to the pins make contact with the upper surface of plate member 41 of the master rod portion 22, causing the sleeves to slide back with respect to their cooperating base members 90, thus releasing the pins from the gripper members and permitting the pins to travel a short distance further into seating position against stop members 125 and 126. When the pins are thus seated in position in the rod assembly, the top and bottom ends of the pins are flush respectively with the outer corresponding surfaces of the top and bottom plates 41 and 42 of the master rod portions, and holes 58 and 58' in the pins are in line with the parallel holes 49 and 50 extending normal thereto. In order to insure that the holes in the pins are in perfect alignment with holes 49 and 50, a cylindrical bar 145 is thrust through the latter holes and then removed.

The cap portion 21 of the engine rod assembly is then positioned on base plate 62 of the fixture device of the invention in the manner indicated in Fig. 18, that is, closely adjacent guide post 63, with holes 26, 27, 28 and 29 of the cap portion located above and in line with stop members or buttons 71, 72, 73 and 74, respectively, of the base plate. Clamp member 64 is then actuated to tighten the cap securely in position. The articulating link rods 34, 35, 36 and 37 are then set in position on base plate 62 with the respective sockets at one end of each of the rods located in relation to the cap so that such sockets are in alignment respectively with holes 26, 27, 28 and 29 therein, eyelets 34''', 35''', 36'' and 37'' of the rods resting on buttons 75, 77, 78 and 76, respectively, of base plate 62.

The solid pivot pins 131 are then installed in the cap portion 21 of the rod assembly as follows: Sleeves 91' of each of the gripper members 133 and 134 of ram head 130 are raised and two of the fork-like tools wedged between each sleeve and the surface of plate 130' of the ram head. The recessed ends of a pair of pivot pins 131 are then brought into contact with the ends or top surfaces 95' of each of gripper members 133 and 134 so that the shoulders 135 on these top surfaces mate with the corresponding recesses 136 in the ends of the pins.

As noted above, the fork-like tools 100 are then removed, leaving the sleeves of the gripper members in engagement with pins 131 and the ram head 130 with the pins attached thereto is inverted and slid over the top of guide post 63 of base plate 62 in the manner shown in Fig. 18, the inner surface of member 132 of the ram head slidably engaging the guide post. With a downward thrust of the ram head from its position in Fig. 18, pivot pins 131 are driven into position in holes 27 and 28 of the cap portion 21 and into the corresponding sockets of link rods 35 and 36, coming to rest with the bottoms of the pins against stop members 72 and 73 on base plate 62. Just prior to this, the lower edges 94' of the sleeves of the gripper members attached to the pins make contact with the upper surface of cap 21, causing the sleeves to slide back with respect to their cooperative base members 90', and releasing the pins from the gripper members and permitting the pins to travel a short distance further into mating position against stop members 72 and 73. In seating position in the rod assembly, the top and bottom ends of pins 131 are flush with the outer surfaces of the top and bottom plates 24 and 25 of the cap.

Fully intersected pivot pins 55 are next installed in the cap portion 21. Two of these pins are positioned on alignment bars 112 and 113 of alignment member 108 by inserting these bars through holes 56 adjacent one end of each of the pins. This assembly is then brought into contact with the ram head 81 having its gripper members 83 and 86 in operative position in the manner above described to receive the pins, that is, with the sleeves of the gripper members held in extended position by means of the fork-like tools 100, whereby the ends of the pins become lodged in the gripper members. After removal of alignment member 108, ram head 81, with the pins attached to gripper members 83 and 86 thereof, is inverted and slid over the top of guide post 63 of base plate 62 in a manner similar to that described above. By a downward thrust of the ram head, the pivot pins 55 are driven into position in holes 26 and 29 of the cap portion 21 and into the corresponding sockets of link rods 34 and 37, and come to rest with their bottoms against stop members 71 and 74 on base plate 62. The pivot pins are released from gripping engagement by gripper members 83 and 86 in the same manner as pins 57 and 131 were released from their respective gripper members as noted above. When the pins are in seated position in the rod assembly, the top and bottom ends of the pins are flush with the outer surfaces of the top and bottom plates 24 and 25 of the cap, and holes 56 and 56' in the pins are in line with parallel holes 30 and 31 extending normal thereto.

Pins 55 and 131 each have a central portion 140 and 141, respectively, and two end portions, apertures 56 and 56' of pins 55 being located in the end portions of the latter pins. When seated in proper position in cap portion 21 of the rod assembly, the end portions of pins 55 and 131 are in tight fixed engagement with respect to the plates 24 and 25 of the cap, and the central portions 140 and 141 of these pins are rotatably or pivotally engaged by the sockets of link rods 34 and 37, and of link rods 35 and 36, respectively. Likewise, pins 57 each have a central portion 142 and two end portions containing the apertures 58 and 58'. When located in proper position in rod portion 22 of the engine rod assembly, the end portions of pins 57 are in fixed relation to the plates 41 and 42 of the rod portion, and the central portions 142 of these pins are rotatably engaged by the sockets of link rods 47 and 48.

Prior to positioning the cap and master rod and their associated link rods on the base plates of the fixture members of Figs. 2 and 11, the cap, master rod and link rods are heated in oil to cause the holes in the cap and master rod, and the corresponding sockets of the link rods to expand to facilitate installation of the pivot or knuckle pins therein. To further aid in this respect, the pins are cooled in Dry Ice before being positioned on the gripper members of ram heads 81 and 130. When all of these members return to normal temperature, the pins are tightly held within the master rod and cap. The thus assembled master rod and cap portions are then removed from base plate 120 and 62 of the fixtures of Figs. 11 and 2, respectively, and are connected together to form the completed engine rod assembly by insertion of through bolts 51 and 52 into parallel holes 30 and 31 of the upper plates 24 and 41 and the lower plates 25 and 42 of the cap and master rod portions respectively, these bolts passing through holes 56 and 56' of the fully intersected pivot pins 55 in the cap portion, and through holes or notches 58 and 58' of the partially intersected pivot pins 57 in the master rod portion, the holes in pins 55 and 57 being so aligned that bolts 51 and 52 pass readily therethrough substantially without the application of any force.

It is noted from the above that the partially intersected knuckle or pivot pins were first installed in the master rod portion, the solid pins next installed in the cap portion and the fully intersected pivot pins installed last in the cap portion. However, this procedure may be changed if desired. For example, the fully intersected pivot pins may be installed in the cap portion first, the solid pins seated in the cap portion next and the partially intersected pins seated in the master rod portion last.

The various parts of the fixture device of the invention may be constructed of any rugged structural material, preferably steel. The pivot pins are constructed of a metal such as steel or copper, or an alloy, and the central portions 140, 141 or 142 thereof are usually silver plated.

From the foregoing, it is apparent the invention affords a device for the installation of pivot pins in an engine rod assembly, which device has important advantages over known devices or fixtures for this purpose. Thus, the invention device enables seating of these pins in proper alignment in the assembly, eliminating twisting and turning of the pins out of their proper position, prevents scratching and impairment of the plated surfaces of the pins during their installation and materially decreases the time and amount of labor required for installation of such pins. Further, the fixture devices of the invention are simple, rugged and inexpensive to manufacture, and require a minimum of expense for repair and maintenance.

Obviously many modifications and variations of the present invention are possible in the light of the above teachings. It is therefore to be understood that within the scope of the appended claims the invention may be practiced otherwise than as specifically described.

We claim:

1. A fixture device for installation of pivot pins in an engine rod assembly, which comprises a first support means for supporting said rod assembly, means for maintaining said rod assembly in position on said support means, a second support means for supporting said pins in spaced relation from said first support means, gripper means on said second support means for securing said pins thereto, said gripper means including a base member, a resiliently expansible sleeve slidably positioned on the base member, means for limiting the longitudinal movement of a sleeve from a position extending beyond said base member to grip one end of the pins, to a position retracted over the base member to release said pins upon engagement of the sleeve with the rod assembly, means on said first support means adapted to movably engage said second support means to conduct it and the pins supported thereby toward said first support means, means on said first support means for contacting one end of said pins for proper positioning thereof in said rod assembly when said second support means is operatively moved toward said first support means.

2. A tool device for installation of pivot pins in an aircraft engine rod assembly, said pins having laterally extending apertures therein for passage of fasteners to assemble the pins in said rod assembly, which comprises a first support means for supporting said rod assembly, clamping means for maintaining said rod assembly in a predetermined position on said support means, a second support means for supporting said pins in spaced relation from said first support means, gripper members on said second support means for securing said pins thereto substantially parallel to each other and in a plane normal to the surface of said first support means, alignment means for positioning said pins in said gripper members for proper alignment of said apertures upon positioning said pins in said rod assembly, means connected to said first support means and extending from the surface thereof for slidably engaging said second support means for movement thereof with said pins attached thereto toward said first support means and a rod assembly positioned thereon, stop means on said first support means located with respect to said rod assembly for contacting one end of said pins for proper positioning thereof in said rod assembly when said second support means is operatively moved toward said first support means.

3. A device as defined in claim 2, wherein said alignment means comprises alignment bars adapted to pass through the apertures of said pins.

4. A device as defined in claim 2, wherein said alignment means comprises a raised portion on the end of each of said gripper members for mating with a corresponding depressed portion on that end of each of said pins adapted to make contact with said gripper members.

5. A fixture device for installation of knuckle pins in an aircraft engine rod assembly for radial engines, said assembly including link rods having sockets therein for accommodating said pins, said pins having laterally extending apertures therein for the passage of fasteners to assemble the pins in said rod assembly, said device comprising a base plate for supporting said rod assembly, said plate having a vertically extending cylindrical guide member, a clamp mounted to the plate in spaced relation to the guide member and having a V-block for securing said rod assembly in a predetermined centered position against the guide member, lugs on the plate member adjacent said guide member and positioned in line with the sockets of said rod assembly to contact one end of said pins for proper positioning thereof in said rod assembly, a ram head slidably engaging said guide member for movement of the former toward and away from said base plate, a plurality of gripper members connected to said ram head, each of said gripper members including a base member, a lug connected to the side of said base member, a sleeve slidably positioned on said base member and a longitudinal slot in said sleeve for engaging said lug, the length of said slot being such that said sleeve is movable longitudinally a short predetermined distance beyond the end of said base member, whereby said gripper members are adapted to grip one end of each of said knuckle pins to maintain them substantially in parallel relation to each other and in a plane normal to the surface of said base plate, and alignment means for positioning said pins in said gripper members for proper alignment of said apertures upon positioning said pins in said rod assembly.

References Cited in the file of this patent
UNITED STATES PATENTS

| | | |
|---|---|---|
| 1,881,533 | Hardiman | Oct. 11, 1932 |
| 2,266,874 | Larson | Dec. 23, 1941 |
| 2,360,158 | Parks | Oct. 10, 1944 |
| 2,666,255 | McCloy et al. | Jan. 19, 1954 |